United States Patent Office 3,177,180
Patented Apr. 6, 1965

3,177,180
POLYESTERS
James D. Doedens, Midland, and Earl H. Rosenbrock, Auburn, Mich., assignors to The Dow Chemical Company, Midland, Mich., a corporation of Delaware
No Drawing. Filed Mar. 13, 1961, Ser. No. 94,984
5 Claims. (Cl. 260—47)

The present invention relates to a new class of polymeric materials and is more particularly concerned with a novel class of low molecular weight polyester resins having the following general repeating unit:

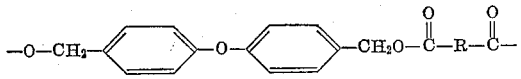

wherein R represents the divalent hydrocarbon residue of a dicarboxylic acid having at least two carbon atoms and which may contain olefinic unsaturation. The new class of compounds has been found to be useful as binders for fibrous laminates, such as glass fiber, iron filings, etc., as casting and molding resins, coatings and, in some instances, for making low molecular weight fibers. The resinous materials have a desirable resistance to attack by solvents.

The new class of polymers can be prepared by reacting by contacting and heating at from about 50° to about 250° C. (1) a hydroxymethylated diphenyl oxide and a dicarboxylic acid or (2) a halomethylated diphenyl oxide and an alkali metal salt of a dicarboxylic acid. The hydroxymethylated diphenyl oxide can be prepared by hydrolyzing with caustic a halomethylated diphenyl oxide in the manner of copending U.S. patent application Serial No. 19,507, filed April 4, 1960, by W. B. Trapp and J. D. Doedens. The halomethylated diphenyl oxide can be prepared in the manner of Doedens et al., U.S. Serial No. 801,986, filed March 26, 1959, entitled "Method for Making 4,4'-Di-Halomethyl)Diphenyl Oxide and Products."

Good results are obtained when the reaction between the hydroxymethylated diphenyl oxide and dicarboxylic acid is carried out preferably in the presence of a solvent inert under the conditions of the reaction and the reaction temperature maintained at from about 50° to about 250° C. for a time sufficient to insure the completion of the reaction. Suitable solvents for use in accordance with the present invention are the aromatic hydrocarbons such as benzene, xylene, toluene, and the like and dioxane. Upon completion of the reaction, the solvent is removed by conventional methods such as distillation under reduced pressure and the resin recovered as a low melting solid residue.

When employing the halomethylated diphenyl oxide and alkali metal salt of the dicarboxylic acid, the reaction is conveniently carried out in aqueous medium. The temperature of reaction is preferably at from about 50° C. to about 250° C. and can be carried out at reduced pressures or super-atmospheric pressures. Upon completion of the reaction, the resinous material which forms is washed with water to remove the salt (alkali metal halide) then heated to above the melting point for a period of time at reduced pressure to complete the polymerization.

Substantially any dicarboxylic acid can be employed in accordance with the present invention. Thus, one can employ the aliphatic dicarboxylic acids, including the saturated, olefinic and acetylenic dicarboxylic acids, the aromatic dicarboxylic acids including their alkyl substituted derivatives as well as the cyclic dicarboxylic acids. Representative of each such class are maleic, fumaric, succinic, glutaric, adipic, pimelic, phthalic, terephthalic, and the like acids as well as butynedioic acids and the like.

Suitable alkali metals useful in forming the salt of the dicarboxylic acid when the same is employed in accordance with the present invention are sodium, potassium, lithium, cesium, and the like.

The following examples are illustrative of the present invention but are not to be construed as limiting.

EXAMPLE 1

*Method involving direct esterification of a dicarboxylic acid and 4,4'-dimethylol diphenol oxide*

75 grams of 4,4'-dimethylol diphenyl oxide (0.326 mole), 48 grams of maleic anhydride (0.326 mole) and 30 grams of toluene were added to a suitably sized reaction flask equipped with an agitator, gas entrance tube, Dean-Stark column and thermometer. The above mixture was heated to 115° C. while allowing a slow stream of nitrogen to pass through. The temperature was held for 3 hours until water ceased to form. Vacuum was applied to the system and the toluene removed to a pot temperature of 200° C. at 0.1 millimeters of mercury. The residue was poured on aluminum foil and allowed to harden. The softening point was 61° C.

EXAMPLE 2

75 grams of 4,4'-dimethylol diphenyl oxide (0.326 mole), 48 grams of adipic acid (0.326 mole) and 30 cc. of toluene were added to a reaction vessel similar to the one described in Example 1. The material was heated for 3 hours, taking the temperature from 26° to 210° C. The reaction batch was stripped of toluene and cooled. The softening point was 59° C.

EXAMPLE 3

75 grams of 4,4'-dimethylol diphenyl oxide (0.326 mole), 47.5 grams of phthalic anhydride and 30 cc. of toluene were added to a reactor as described in Example 1. The mixture was heated for 7 hours at 145° C., stripped of toluene and cooled to room temperature. The softening point was 62° C.

EXAMPLE 4

75 grams of 4,4'-dimethylol diphenyl oxide (0.326 mole), 53 grams of phthalic acid (0.326 mole) and 30 grams of toluene were added to a vessel similar to the one described in Example 1. The reaction mixture was heated for 6 hours at 145° C., stripped of solvent and cooled to room temperature. The softening point was 57° C.

EXAMPLE 5

*Method involving the reaction of the sodium salt of the acid and 4,4'-dichloromethyl diphenyl oxide*

Sodium phthalate was prepared by reacting 54 grams of phthalic acid, 27 grams of sodium hydroxide and 27 grams of water at room temperature for one hour.

To the above prepared sodium salt was added 86 grams of 4,4'-di(chloromethyl)diphenyl oxide. The reaction mixture was allowed to reflux for 2 hours at 105°–110° C. 400 cc. of water was added after cooling to room temperature and the product washed with water until free of Cl⁻. The organic material was transferred to a resin pot and heated to 230° C. over a 2 hour period at 5 millimeters of mercury. On cooling, softening point determination showed 69° C.

EXAMPLE 6

Sodium adipate was prepared by reacting 47.5 grams of adipic acid with 27 grams of sodium hydroxide and 27 grams of water at room temperature for one hour.

To the above-prepared sodium salt was added 86 grams of 4,4'-di(chloromethyl)diphenyl oxide. The reaction was carried out in a manner similar to that described in Example 5.

EXAMPLE 7

Sodium maleate was prepared by the reaction of 38 grams of maleic acid, 27 grams of sodium hydroxide and 27 grams of water were reacted at room temperature for one hour.

To the above-prepared sodium salt was added 86 grams of 4,4'-di(chloromethyl)diphenyl oxide. The reaction was run as described in Example 5.

We claim:

1. A resinous polyester consisting essentially of the repeating unit having the formula

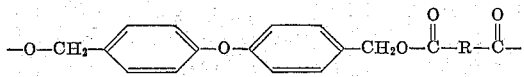

wherein R represents a divalent hydrocarbon radical having at least two carbon atoms.

2. A polyester as set forth in claim 1 wherein R is phenylene.

3. A polyester as set forth in claim 2 wherein R is ortho-phenylene.

4. A polyester as set forth in claim 2 wherein R is para-phenylene.

5. A polyester as set forth in claim 1 wherein R has the formula $$-CH=CH-$$

References Cited by the Examiner

UNITED STATES PATENTS

| | | | |
|---|---|---|---|
| 2,595,343 | 5/52 | Drewitt | 260—47 |
| 2,967,854 | 1/60 | Bungs | 260—47 |

WILLIAM H. SHORT, *Primary Examiner.*

P. E. MANGAN, LOUISE P. QUAST, *Examiners.*